US011588176B2

(12) United States Patent
Lin et al.

(10) Patent No.: US 11,588,176 B2
(45) Date of Patent: Feb. 21, 2023

(54) ALL SOLID-STATE LITHIUM-ION BATTERY INCORPORATING ELECTROLYTE-INFILTRATED COMPOSITE ELECTRODES

(71) Applicant: Bioenno Tech LLC, Santa Ana, CA (US)

(72) Inventors: Zhigang Lin, Santa Ana, CA (US); Chunhu Tan, Santa Ana, CA (US); Tianyu Meng, Santa Ana, CA (US)

(73) Assignee: Bioenno Tech LLC, Santa Ana, CA (US)

( * ) Notice: Subject to any disclaimer, the term of this patent is extended or adjusted under 35 U.S.C. 154(b) by 168 days.

(21) Appl. No.: 17/140,690

(22) Filed: Jan. 4, 2021

(65) Prior Publication Data

US 2022/0216505 A1    Jul. 7, 2022

(51) Int. Cl.
| | | |
|---|---|---|
| *H01M 10/0562* | (2010.01) | |
| *H01M 4/62* | (2006.01) | |
| *H01M 4/505* | (2010.01) | |
| *H01M 10/0525* | (2010.01) | |
| *H01M 4/525* | (2010.01) | |
| *H01M 4/02* | (2006.01) | |

(52) U.S. Cl.
CPC ....... *H01M 10/0562* (2013.01); *H01M 4/505* (2013.01); *H01M 4/525* (2013.01); *H01M 4/622* (2013.01); *H01M 4/625* (2013.01); *H01M 10/0525* (2013.01); *H01M 2004/021* (2013.01); *H01M 2300/0071* (2013.01)

(58) Field of Classification Search
None
See application file for complete search history.

(56) References Cited

U.S. PATENT DOCUMENTS

| | | | |
|---|---|---|---|
| 5,319,517 A | 6/1994 | Nomura | |
| 5,728,489 A | 3/1998 | Gao | |
| 5,834,136 A | 11/1998 | Gao | |
| 5,964,903 A | 10/1999 | Gao | |
| 6,020,087 A | 2/2000 | Gao | |
| 6,072,688 A | 6/2000 | Hennings | |
| 6,156,458 A | 12/2000 | Brodd | |
| 6,596,440 B2 | 7/2003 | Gavelin | |
| 6,905,762 B1 | 6/2005 | Jow | |
| 7,166,366 B2 | 1/2007 | Moser | |
| 7,604,892 B2 | 10/2009 | Yoo | |
| 7,935,442 B2 | 5/2011 | Kim | |
| 8,198,783 B2 | 6/2012 | Bayer | |
| 9,548,514 B2 | 1/2017 | Kyu | |
| 9,819,053 B1 | 11/2017 | Zimmerman | |
| 10,297,874 B2 | 5/2019 | Omori | |
| 11,223,088 B2 * | 1/2022 | Lin | ........................ H01M 6/185 |
| 2005/0287441 A1 | 12/2005 | Passerini | |
| 2011/0281160 A1 * | 11/2011 | Doi | ................... H01M 10/0562 |
| | | | 429/211 |
| 2018/0138545 A1 * | 5/2018 | Aburatani | ................ C03C 10/16 |
| 2020/0144665 A1 * | 5/2020 | Huang | ................ C08G 18/5021 |
| 2020/0335814 A1 | 10/2020 | Lin | |

FOREIGN PATENT DOCUMENTS

| | | | |
|---|---|---|---|
| CN | 106941190 | * | 7/2017 |
| WO | WO 2018/089430 | * | 5/2018 |

OTHER PUBLICATIONS

Machine translation of CN 106941190, published on Jul. 11, 2017 (Year: 2017).*
Gonzalez, F., Garcia-Calvo, O., Tiemblo, P., Garcia, N., Fedeli, E., Thieu, T., Urdampilleta, I., Kvasha, A.—Synergy of Inorganic Fillers in Composite Thermoplastic Polymer/Ionic Liquid/LiTFSI Electrolytes, Journal of the Electrochemical Society, 2020, 167, 070519 (Year: 2020).*

* cited by examiner

*Primary Examiner* — Anca Eoff
(74) *Attorney, Agent, or Firm* — Charles H. Jew

(57) ABSTRACT

Electrolyte-infiltrated composite electrode includes an electrolyte component consisting of a polymer matrix with ceramic nanoparticles embedded in the matrix to form a networking structure of electrolyte. Suitable ceramic nanoparticles have the basic formula $Li_7La_3Zr_2O_{12}$ (LLZO) and its derivatives such as $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0. The networking structure of the electrolyte establishes an effective lithium-ion transport pathway in the electrode and strengthens the contact between electrode layer and solid-state electrolyte resulting in higher lithium-ion electrochemical cell's cycling stability and longer battery life. Sold-state electrolytes incorporating the ceramic particles demonstrate improved performance. Large dimensional electrolyte-infiltrated composite electrode sheets can be used in all solid-state lithium electrochemical pouch cells which can be assembled into battery packs.

14 Claims, 8 Drawing Sheets

ALL SOLID-STATE LITHIUM-ION BATTERY INCORPORATING ELECTROLYTE-INFILTRATED COMPOSITE ELECTRODES

The invention was made with Government support under SBIR Grant No. N6833518C0685 awarded by the U.S. Navy to Bioenno Tech LLC.

FIELD OF THE INVENTION

The present invention generally relates to electrochemical devices and, more particularly, to electrolyte-infiltrated composite electrodes exhibiting a network of electrolyte which improves the cycling stability and lifetime of all solid-state lithium-ion electrochemical cells and batteries through establishing Li-ion transport pathways in the electrode and strengthening contact between the electrode layer and solid state-electrolyte membrane.

BACKGROUND OF THE INVENTION

Non-aqueous lithium electrochemical cells typically include an anode, a lithium electrolyte prepared from a lithium salt dissolved in organic solvents, and a cathode of an electrochemically active material. Organic solvents are added to solvate the lithium salt which provides mobile ions. During the electrochemical discharge process lithium ions are transported through the electrolyte from the anode to the cathode. As lithium ions are taken up by the cathode, there is a simultaneous release of electrical energy.

Solid-state electrolyte (SSE) can replace conventional organic liquid electrolytes, which are generally flammable and toxic. Conventional electrode materials and lithium metal anodes can be employed with a SSE. Lithium anodes have high inherent high capacities (C) which increase the cell voltage (V) and thereby improves the energy density of the battery (E=VC). There are two critical challenges to achieving high performance batteries using SSE, which are (1) low ionic conductivities of many SSE, and (2) the low mechanical strengths of electrolyte materials do not adequately prevent Li dendrite growth. SSE which are being explored are typically inorganic-based (depending on the lattice structure, they are garnet, perovskite, glass-ceramics etc.) and polymer-based. Solid polymer electrolytes can be manufactured by relatively simple, inexpensive techniques whereas fabricating solid inorganic electrolytes with well-defined compositions or lattice structures requires high temperature processes. Due to the high degree of coordination between Li ions and the polymer chain in sold-state polymer electrolytes, the chain-assisted $Li^+$ transport mechanism is less robust at room temperature or below the melting temperature of the polymer. The attendant poor ionic conductivity is attributed to interference with Li ion transport. The addition of plasticizers to the solid-state polymer-based electrolyte improves the polymer chain mobility at room temperature which results in an increase in the ionic conductivity, but the plasticizers also reduce the mechanical strength of the solid-state polymer-based electrolyte.

So-called all-solid-state batteries contain exclusively solid materials, and in particular solid-state electrolytes, in contrast to conventional batteries containing liquid electrolytes. One of the main concerns of current all solid-state lithium-ion batteries (ASSLiB) is the poor contact between solid electrolyte and electrodes. The high contact resistance causes low rate capability and poor cycling stability. With solid polymer electrolytes, lithium dendrites, which develop as an electrochemical cell undergoes charging and discharging cycles, can penetrate through the 'plasticizer-softened' polymer electrolytes to short circuit the cell.

SUMMARY OF THE INVENTION

The present invention is based, in part, on the development of an electrolyte (ceramic-polymer nanocomposite)-infiltrated composite electrode that has a 3-dimensional polymer matrix with ceramic nanoparticles distributed or embedded in the matrix. In one aspect, the invention is directed to a ceramic-polymer-containing composite electrode that includes: (i) a polymer matrix, (ii) ceramic nanoparticles that are distributed in the polymer matrix, (iii) a lithium salt, (iv) a plasticizer, (v) an anode active material or cathode active material that is distributed in the polymer matrix, (vi) a conducting agent that is distributed in the polymer matrix, (vii) additional binder (optional), for instance, if the weight ratio of active material is high.

In another aspect, the invention is directed to a ceramic-polymer-infiltrated composite electrolyte membrane that includes: (i) a polymer matrix, (ii) ceramic nanoparticles with diameters that range from 10 to 2000 nm that are distributed in the polymer matrix, (iii) a plasticizer (iv) a lithium salt, wherein the ceramic nanoparticles are selected from the group consisting of ceramic materials having the basic formula $Li_7La_3Zr_2O_{12}$ (LLZO) and its dopant derivatives, such as $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof. Incorporating ceramic nanoparticles to enhance the mechanical strengths of polymer electrolytes can suppress Li dendrite growth, which significantly improves the cycling stability of batteries based on ceramic-polymer composite solid electrolytes. Moreover, nano-sized ceramic particles have excellent miscibility with the polymer materials and the particles afford ionic transport channels which facilitate ion transport within the ceramic-polymer solid electrolyte layer. The ceramic-polymer composite electrolyte exhibits high ionic conductivity over a wide temperature window.

In a further aspect, the invention is directed to an electrochemical cell which includes: (a) an electrolyte-infiltrated composite anode that includes: (i) a first polymer matrix, (ii) first ceramic nanoparticles that are distributed in the first polymer matrix, (iii) a lithium salt, (iv) a plasticizer, (v) an anode active material that is distributed in the first polymer matrix, (vi) a first conducting agent that is distributed in the first polymer matrix, and (vii) additional binder if weight ratio of active material is high (>80 wt %);

(b) an electrolyte-infiltrated composite cathode that includes: (i) a second polymer matrix that can be same as the first polymer matrix for the composite anode, (ii) a second ceramic nanoparticles that can be same as the first ceramic nanoparticles for the composite anode and that are distributed in the second polymer matrix, (iii) a lithium salt, (iv) a plasticizer, (v) a cathode active material that is distributed in the second polymer matrix, (vi) a second conducting agent that can be same as the first conducting agent for the composite anode and that is distributed in the second polymer matrix, and (vii) additional binder if the weight ratio of active material is high (>80 wt %); and (c) interposed between the anode and the cathode, a solid-state electrolyte which comprises a ceramic-polymer composite electrolyte membrane that includes: (i) a third polymer matrix that can be same as the polymer matrix for the composite electrodes, (ii) third ceramic nanoparticles with diameters that range from 10 to 2000 nm that can be same as the ceramic nanoparticles for the composite electrodes and that are distributed in the third polymer matrix, (iii) a plasticizer and (iv) a lithium salt, wherein the third ceramic nanoparticles are selected from the group consisting of ceramic materials having the basic formula $Li_7La_3Zr_2O_{12}$ (LLZO) and its derivatives, such as $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof. The presence of undoped LLZO ($Li_7La_3Zr_2O_{12}$) and/or doped LLZO enhances the ionic conductivity of the electrolyte membrane. Particularly preferred doped LLZO has (i) Al and Ta or (ii) Nb. The ceramic-polymer composite electrolyte is a solid-state electrolyte that exhibits excellent chemical and electrochemical stability with respect to the anode and cathode.

In this electrochemical cell, the cathode's polymeric networking structure of electrolyte serves as ionic conductive pathways for electrons and $Li^+$ transport for active material particles during the lithiated/delithiated process. This continuous $Li^+$ conductive network in the cathode composite produces a cathode with higher energy/power performance. The crosslinking structure of the polymeric network or polymer matrix strongly binds all of the cathode components. The composite anode and composite cathode form good physical interfacial contacts with the composite electrolyte membrane for improved rate performance and cycling stability.

DETAILED DESCRIPTION OF PREFERRED EMBODIMENTS

Figure 1A:
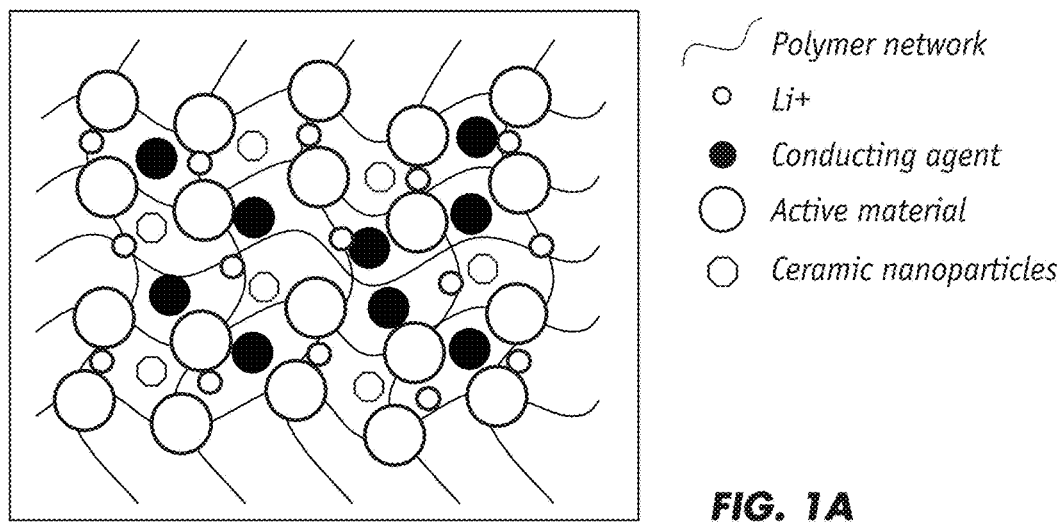
FIG. 1A depicts the networking structure of the electrolyte and resultant electrolyte-infiltrated composite electrode.

This invention is directed to ceramic-polymer electrolyte infiltrated composite electrodes (cathodes and anodes) that are particularly suited for used in lithium-ion electrochemical cells and batteries. The electrode has a polymer-based electrolyte forming a 3 dimensional-like networking structure in which (1) active materials (cathode or anode), (2) conducting agent, and (3) lithium salt and (4) ceramic nanoparticles are homogeneously distributed throughout the network. The electrode can include a plasticizer and a binder, if required.

The active materials for anodes include any compatible anodic material which functions as an anode in solid lithium-ion electrochemical cells. Preferred anode active materials are graphite based and silicon-based materials.

The active materials for cathodes include any compatible cathodic material which functions as a positive pole in a solid lithium electrochemical cell. Preferred cathode active materials which are compatible with the polymer-based electrolyte comprise, for example, $LiFePO_4$ (LFP), $LiNi_{0.8}Co_{0.1}Mn_{0.1}O_2$ (NCM811), $LiNi_{0.5}Co_{0.2}Mn_{0.3}O_2$ (NCM 523) and $LiNi_{0.6}Co_{0.2}Mn_{0.2}O_2$ (NCM 622) and mixtures thereof.

The conducting agent is an electronically conductive material that is preferably made of carbon, in particular elemental carbon. The electronically conducting agent can be, for example, carbon black.

The lithium salt is any lithium salt suitable for solid lithium electrochemical cells. These include, for example, bis(trifluoromethane)sulfonimide lithium salt (LiTFSI), lithium hexafluorophosphate ($LiPF_6$), lithium hexafluoroarsenate ($LiAsF_6$), $LiClO_4$, lithium bis(oxalato)borate (LiBoB), and mixtures thereof.

The polymer matrix component of the electrolyte is formed from a mixture of monomers, oligomers or partial polymers thereof (collectively referred to as polymer precursors). Preferred polymer matrices comprise poly(ethylene oxide) (PEO), poly(ethylene glycol diacrylate) (PEGDA), poly(acrylonitrile) (PAN), polysiloxane, poly(vinylidene fluoride-co-hexafluoropropylene) [P(VDF-HFP)], poly(methyl methacrylate) (PMMA), and mixtures thereof.

The ceramic nanoparticles comprise lithium metal oxides with diameters that range from 10 nm to 2000 nm. Preferred ceramic nanoparticles include $Li_7La_3Zr_2O_{12}$ (LLZO) and derivatives thereof wherein specific quantities of Al, Ta and/or Nb are substituted at the Zr sites. Derivatives include, for example, $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof. Particularly preferred ceramic nanoparticles are $Al_xLi_{7-x}La_3Zr_{1.75}Ta_{0.25}O_{12}$ (x ranges from 0.01 to 0.85) and $Li_7La_3Zr_{2-z}Nb_zO_{12}$ (z ranges from 0.01 to 0.60) which exhibit improved the ionic transport in the electrodes.

LLZO and derivatives thereof are commercially available from Millipore Sigma (St. Louis, Mo.) and MSE Supplies (Tucson, Ariz.). Derivatives of LLZO can be manufactured by standard solid-state techniques using different proportions of $Al_2O_3$, $Ta_2O_5$, and/or $Nb_2O_5$. For example, $Al_xLi_{7-x}La_3Zr_{1.75}Ta_{0.25}O_{12}$ wherein x ranges from 0 to 0.85 is synthesized by mixing stoichiometric amounts of starting powders including $LiOH.H_2O$, $La_2O_3$, $ZrO_2$, $Al_2O_3$ and $Ta_2O_5$ and milling the mixture via high energy ball milling in ethanol media for 8-12 hrs. Zirconia balls (average diameter of 5 mm) balls at a ball-to-powder weight ratio of about 20:1 and about 360 rpm milling speed. After milling, the collected slurry is dried (80° C., 2-3 hrs.), crushed, and sieved (through a 200 mesh), and calcined at about 900° C. for 6 hours to fully decompose LiOH. The as-calcined powders are then ball-milled again in ethanol for 6-12 hrs. Planetary ball mill was used, followed by drying process.

The dried powders were pressed into pellets with diameters of about 9.5 mm at about 300 MPa, and then sintered with a temperature range from 800° C. to 1150° C. for about 4 hrs. to obtain particles with size from 100 nm to 2000 nm. Both calcination and sintering processes are carried out with samples in alumina crucibles covered by alumina lids, and the pellets are embedded in corresponding mother powder in order to mitigate losses of volatile components and accidental contamination.

The plasticizer is a compound that is preferably solid at room temperature (20° C.) and serves as a liquid medium in which the polymer precursors can polymerize to form a polymer matrix. Preferred plasticizers are organic compounds such as succinonitrile (SCN), sulfolane (SL), ethylene carbonate (EC), dimethyl sulfoxide (DMSO), glutaronitrile (GN), propylene carbonate (PC), and mixtures thereof.

Binders such as polyvinylidene fluoride (PVDF) and polyacrylic acid (PAA) can be used as necessary. PVDF is used if the weight ratio of active material is high. In the case of anodes, binders can be used if the active material is about 80 wt % or more and in the case of cathodes binders can be used if the active material is about 80 wt % or more.

Anodes of the present invention typically include 60 to 96 wt % anode material, 1 to 15 wt % conducting agent, 0.1 to 10 wt % lithium salt, 0.1 to 5 wt % ceramic nanoparticles, 0.1 to 10 wt % plasticizer, 0.1 to 5 wt % polymer matrix and 0 to 15 wt %, binder.

Cathodes of the present invention typically include 60 to 96 wt % cathode material, 1 to 15 wt % conducting agent, 0.1 to 10 wt % lithium salt, 0.1 to 5 wt % ceramic nanoparticles, 0.1 to 10 wt % plasticizer, 0.1 to 5 wt % polymer matrix and 0 to 15 wt %, binder.

The composite electrode as depicted in FIG. 1A has a polymer network or matrix with cathode or anode active materials, conducting agents, lithium ions and ceramic nanoparticles that distributed or infiltrated within the matrix. The composite electrode with its 3-D polymer network structure exhibits (i) enhanced ion-transport and (ii) improved contact with solid electrolytes. Lithium-ion batteries incorporating these composite electrodes will have high energy densities, excellent rate performances and long cycle lifetimes.

Figure 1B:
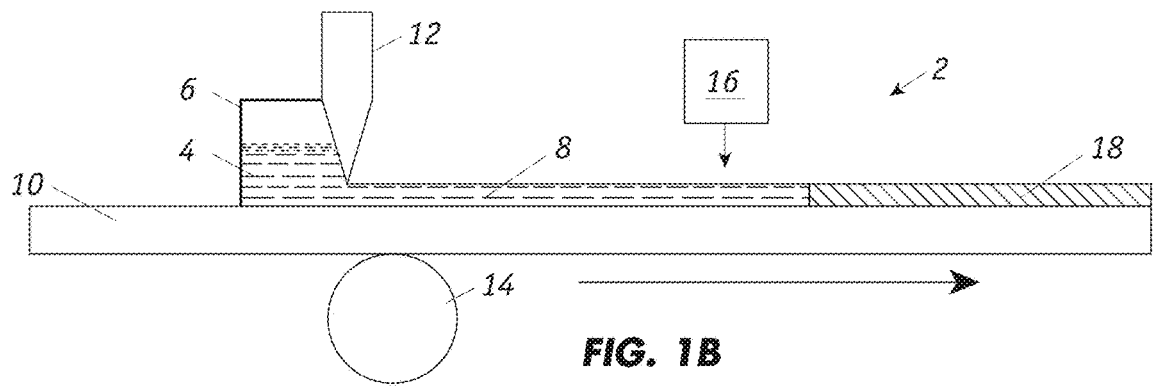
FIG. 1B is an apparatus for producing electrolyte-infiltrated composite cathodes and anodes.
Figure 1C:
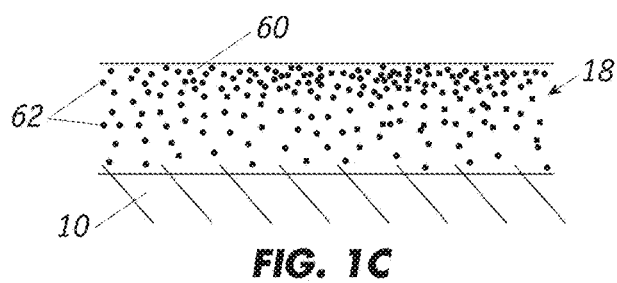
FIG. 1C depicts a gradient of nanoparticles within the electrolyte-infiltrated composite.

FIG. 1B shows a tape-casting system 2 for preparing the composite electrode. The anode or cathode active materials, conducting agent and binder are preferably dried under vacuum before being added into tank 6. A mixture of polymer precursor and plasticizer is added to tank 6 to form a precursor slurry, which also contains 0.001 wt % to 1.0 wt % of a photoinitiator such as phenyl bis(2,4,6-trimethylbenzoyl)phosphine oxide (819). An adjustable doctor blade 12 coats a wet film 8 of the precursor slurry of the desired thickness onto the current collector foil 10 which is supported by stationary roll 14. UV radiation directed to wet film 8 from UV source 16 initiates in-situ radical polymerization to crosslink the polymer precursor in the electrode composite 18. The monomer or polymer precursors polymerize and/or crosslinked, which establishes polymer network that has strong interactions with the other components in the electrode. Therefore, the polymer matrix can act as binder and completely or partial replace the traditional binder such as PVDF. It has been found that ceramic nanoparticles accumulate toward the top of the composite electrode 18 so that a ceramic nanoparticle gradient is established within layer 18 along the direction of the thickness. As shown in FIG. 1C, a cathode substrate 10 is laminated with a layer of composite electrode wherein polymer matrix 60 is formed on substrate 10 and the nanoparticles 62 are not homogeneously distributed. The upper side of the composite electrode on which the anode is disposed has a higher concentration of ceramic nanoparticles which acts as a barrier to lithium dendrite growth. To fabricate electrodes with the ceramic nanoparticles homogeneously distributed therein, the polymer precursors should be cured rapidly or adjusted to have a higher viscosity in order to prevent potential migration of the nanoparticles in the course of processing.

As an example, to prefabricate an electrolyte-infiltrated composite anode by tape-casting method without using a binder, a precursor slurry comprising 1 wt % to 10 wt % carbon black, 60 wt % to 96 wt % graphite and 1 wt % to 20 wt % polymer precursor are mixed at 50° C. to 70° C. for at least 12 hours in N-Methyl-2-pyrrolidone (NMP) solvent. Typical solvent-to-solid ratio is 1 ml to 0.5 g~1.0 g solid. The slurry is printed on an anode current collector, typically copper foil, by tape-casting method and the printed sheets are under UV light for 10 minutes. Finally, the sheets are dried, calendared and cut.

As an example, to fabricate an electrolyte-infiltrated composite cathode by a tape-casting method without using a binder, 1 wt % to 10 wt % carbon black, 60 wt % to 96 wt % LFP and 1 wt % to 20 wt % polymer precursors are mixed in N-Methyl-2-pyrrolidone (NMP) solvent. Typical solvent-to-solid ratio is 1 ml to 0.6 g~1.2 g solid. The slurry is printed on cathode current collector, typically aluminum foil, by tape-casting method and the printed sheets are under UV light for 10 minutes. Finally, the sheets are dried, calendared and cut.

The ceramic-polymer nanocomposite exhibits outstanding ionic conductivities of over $1\times10^{-3}$ S/cm from a temperature range of $-30°$ C. to $10°$ C. and that is higher than $1\times10^{-3}$ S/cm when measured at a temperature of 20° C. or higher and wide electrochemical window of up to 4.8V at room temperature. Moreover, it is thermally stable below 150° C. and low glass transition temperature of $-60°$ C. Finally, this electrolyte shows low interfacial resistance, good compatibility with both lithium metal as anode material, other anode materials and cathode materials, with enhanced mechanical strength with a Young's modulus that exceeds 50 MPa.

Anodes and cathodes of the present invention can be used in solid-state lithium ion electrochemical cells and batteries with solid-state polymer electrolytes. A particularly preferred solid-state electrolyte is a ceramic-polymer composite electrolyte membrane that comprises: (i) a polymer matrix, (ii) ceramic nanoparticles with diameters that range from 10 to 2000 nm that are distributed in the polymer matrix, (iii) a plasticizer (iv) a lithium salt, wherein the ceramic nanoparticles are selected from the group consisting of ceramic materials having the basic formula $Li_7La_3Zr_2O_{12}$ (LLZO) and derivatives thereof wherein specific quantities of Al, Ta and/or Nb are substituted at the Zr sites. Derivatives include, for example, $A_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof. Particularly preferred ceramic nanoparticles are $Al_xLi_{7-x}La_3Zr_{1.75}Ta_{0.25}O_{12}$ (x ranges from 0.01 to 0.85) and $Li_7La_3Zr_{2-z}Nb_zO_{12}$ (z ranges from 0.01 to 0.60).

The polymer matrix, ceramic nanoparticles, plasticizer and lithium salt used for the electrolyte membrane can be the same as those used in preparing the inventive ceramic-polymer composite electrodes. The ceramic-polymer composite electrolyte membrane typically includes 20 to 60 wt % lithium salt, 5 to 60 wt % ceramic nanoparticles, 10 to 60 wt % plasticizer, and 10 to 50 wt % polymer matrix. The electrolyte membrane exhibits an ionic conductivity of higher than $1 \times 10^{-4}$ S/cm when measured at a temperature in the range of $-20°$ C. to $10°$ C. and higher than $1 \times 10^{-3}$ S/cm when measured at a temperature $20°$ C. or higher.

Figure 2:
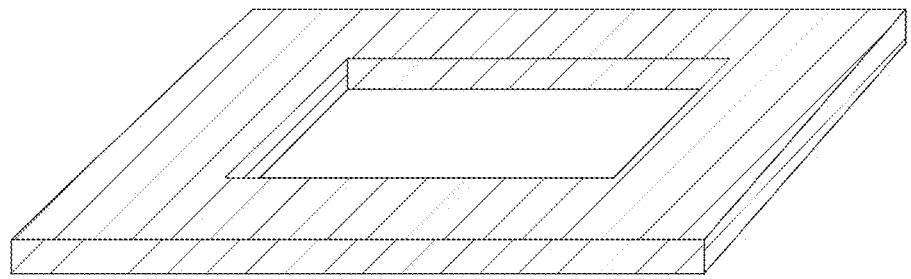
FIG. 2 is a specific designed module for in-situ polymerization of a solid-state electrolyte.

FIG. 2 illustrates a mold structure for making the solid-state electrolyte. A precursor solution consisting of polymer precursor, ceramic nanoparticles, plasticizer, lithium salt and binder is mixed and poured onto the specifically designed module which has a precisely controlled geometry. The module serves as a mold and is made from a sheet of plastic wherein the aperture or opening with specific dimensions formed. A typical module has a rectangular aperture having (L×W×H) dimensions of 6.2 cm×4.6 cm×0.2 mm, respectively, which is specifically designed for special prototype. In-situ polymerization yields a free-standing solid-state electrolyte that can be peeled off the module. A large size solid-state electrolyte is assembled with comparable size cathode and anode sheets, to fabricate all solid-state lithium-ion pouch cells with targeted performance of 3.6V/2.0 Ah that can be further assembled into battery packs of with 28V/5 Ah or 28/25 Ah specifications. UV radiation is applied to the film for polymerization to produce a layer of solid-state electrolyte. For fabricating electrochemical coin cells or pouch cells, the wet film is typically 30 to 900 μm thick.

Lithium electrochemical cells and batteries employing the large size solid-state electrolyte will have excellent rate performance as well as outstanding cycling stability (>1000 cycles) over a wide range of temperatures. Batteries with the novel ceramic-polymer nanocomposite electrolyte will meet severe specifications for wide temperature working ranges, quick charging requirement, and high energy density.

An exemplary electrochemical cell includes a LFP cathode, a solid-state electrolyte, and a graphite anode, with a single layer or multi-layer structure. The anode and solid electrolyte define a first interface where graphite and solid electrolyte meet and form intimate contacts. Similarly, the cathode and solid electrolyte define a second interface where LFP and solid electrolyte meet and form intimate contacts. With the use of a networking-structure electrolyte in the electrodes, the intimate contacts afford good ion transport and reduce interfacial resistance.

Lithium electrochemical coin cells are manufactured by positioning an anode, electrolyte, cathode, spacers, and springs between two electrode shells and crimping the entire assembly. A high-pressure crimper typically applies a pressure of about 100 to 1500 psi.

Figure 3A:
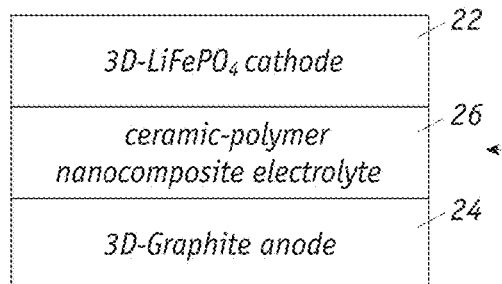
FIG. 3A is a cross sectional illustration of an electrochemical cell.
Figure 3B:
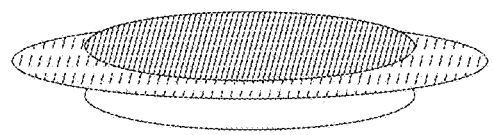
FIG. 3B depicts a coil cell.

FIG. 3A depicts an electrochemical cell 20 that comprises an LFP cathode 22 and lithium metal anode 24 with a ceramic-polymer nanocomposite solid-state electrolyte 26 interposed in-between. The anode 24 and electrolyte 26 layers define a first interface where the lithium metal and electrolyte materials meet and form intimate contacts. Similarly, the cathode 22 and electrolyte 26 layers define a second interface where the LFP and electrolyte materials meet and form intimate contacts. The intimate contacts afford good ion transport and reduce interface resistance. The electrochemical cell can be encapsulated to form a "coin cell" as shown in FIG. 3B. The coin cell has current collectors on the exterior surfaces of the cathode and anode. Electrochemical cells can be stacked into batteries.

Figure 3C:
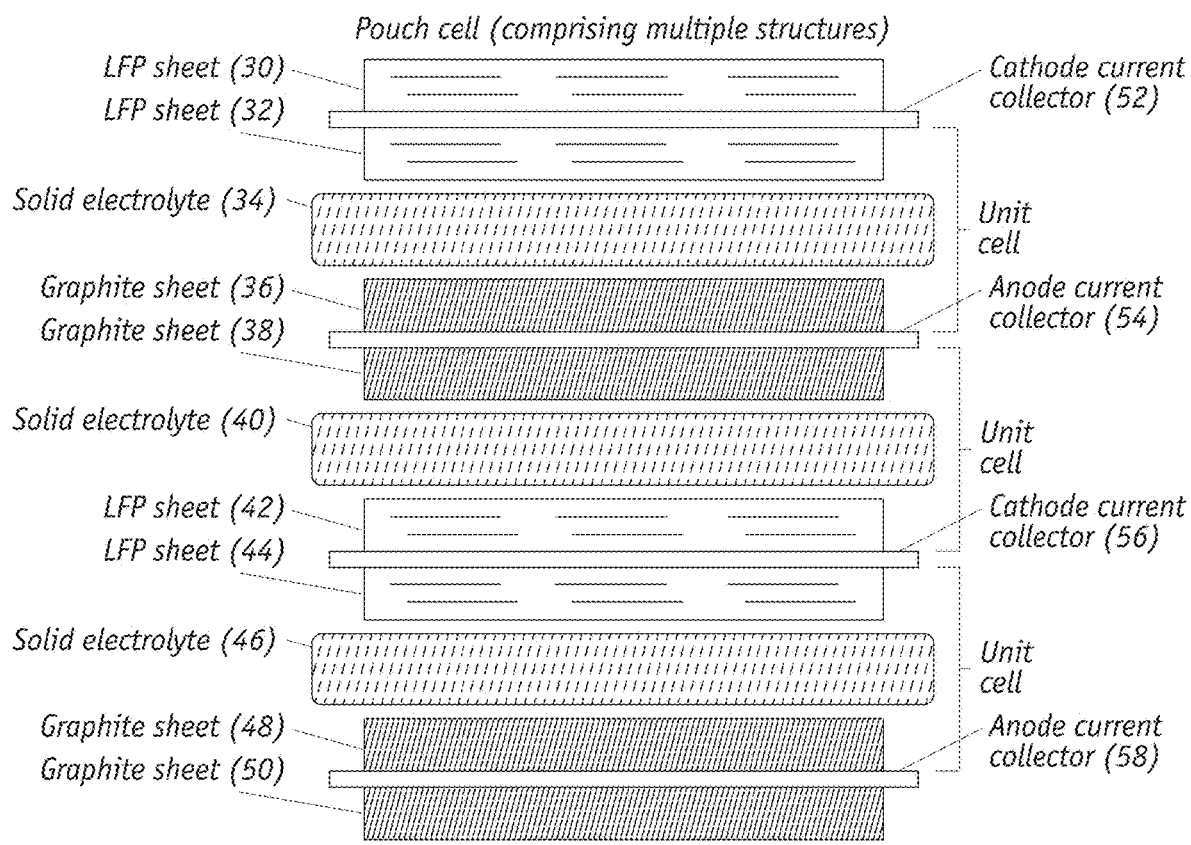
FIG. 3C depicts a pouch cell.

Electrochemical cells can be encapsulated to form a "pouch cell" type battery as shown in FIG. 3C which includes a plurality of unit cells. In this configuration, the pouch cell includes LFP cathode sheets 30 and 32 that are connected to cathode current collector 52, anode graphite sheets 36 and 38 that are connected to anode current collector 54, LFP cathode sheets 42 and 44 that are connected to cathode current collector 56, and anode graphite sheets 48 and 50 that are connected to anode current collector 58. Solid electrolytes 34, 40, and 46 are positioned between the anodes and cathodes as shown.

After the cathode, the electrolyte and the anode are stacked and the cell is assembled, the entire structure is calendared to ensure intimate contact between the layers. Calendaring techniques include plain plate calendar and hot isostatic pressing or the combination of both. High temperature is also applied during calendaring process as the polymer becomes "soft" at high temperatures so that it becomes easier and more effective to compress the structure and create compact contacts between polymer and electrode. The temperature is selected based on the formulation of the solid electrolyte which ranges from $60°$ C. to $180°$ C.

When conducting plain plate calendar for coin cells, the cell is placed between two dies of the crimping machine, where two dies are wrapped by copper plate for initiating high temperature. After heating, the coin cell is crimped at a crimping pressure that typically ranges from 500 psi to 10000 psi.

Lithium electrochemical pouch cells are assembled by stacking the anode, electrolyte and cathode and then welding the cathode sheets and welding the anode sheets. The entire structure is placed in a cell case, which is typically a laminated aluminum case, for final sealing.

When conducting plain plate calendar for pouch cell, the cell is placed between two metal plates with heating available for both plates. After heating, pressure that typically ranges from 200 psi to 1500 psi is applied.

When conducting hot isostatic pressing for pouch cells, the assembled cell is sealed in a vacuum waterproof bag and is put inside the isostatic pressing machine. After heating, high isostatic pressure typically ranging from 2,000 psi to 80,000 psi is applied.

Pouch cells can be calendared by using plain plate calendar, hot isostatic pressing or the combination of both.

Figure 3D:
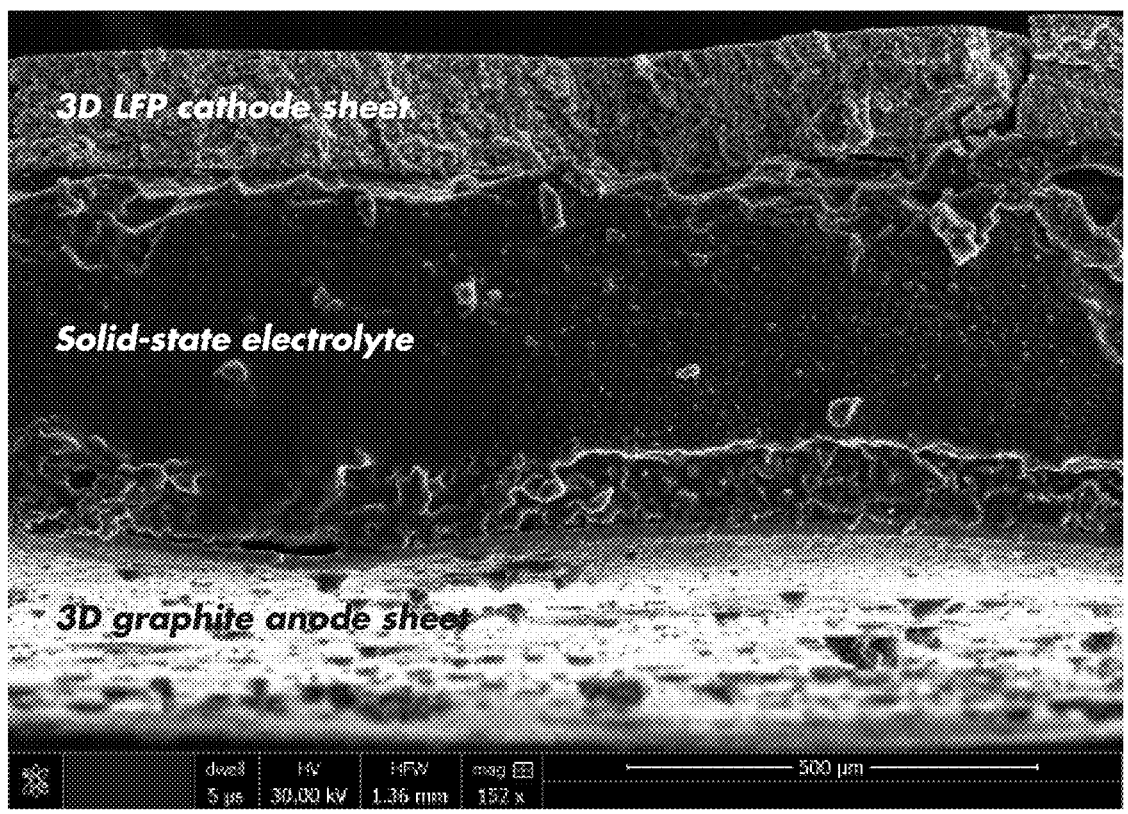
FIG. 3D is a cross-section scanning electrode microscopy (SEM) image of an electrochemical cell containing an electrolyte-infiltrated cathode, electrolyte-infiltrated anode and polymer (e.g., PEGDA)-ceramic (e.g., LLZO) SSE.

FIG. 3D shows the cross-sectional scanning electron image (SEM) of a cell core comprising a composite cathode sheet, solid electrolyte and anode sheet. The cathode sheet, solid electrolyte layer and anode sheet are clearly distinguishable. The optical response spectrum is determined by the solid electrolyte.

Coin cells containing different cathode formulations designated C1, C2 and C3 were evaluated. For each cell, lithium metal sheet was used as the anode. The solid-state electrolyte membrane positioned between the anode and cathode comprised 12.5 wt % polymer matrix that was derived from PEGDA, 37.5 wt % EC, 33 wt % LiTFSI, 17 wt % $Al_{0.15}Li_{6.85}La_3Zr_{1.75}Ta_{0.25}O_{12}$ with diameters that ranged from 10 to 2000 nm.

Cathode C1 comprised 10 wt % carbon black, 80 wt % LFP, 1.67 wt % LiTFSI, 0.82 wt % $Al_{0.15}Li_{6.85}La_3Zr_{1.75}Ta_{0.25}O_{12}$ with diameters that ranged from 10 to 2000 nm, 1.88 wt % EC, 0.63 wt % polymer matrix that is derived from PEGDA and 5 wt % PVDF.

Cathode C2 comprised 10 wt % carbon black, 80 wt % LFP, 3.34 wt % LiTFSI, 1.66 wt % $Al_{0.15}Li_{6.85}La_3Zr_{1.75}Ta_{0.25}O_{12}$, with diameters that ranged from 10 to 2000 nm, 3.75 wt % EC, 1.25 wt % polymer matrix that is derived from PEGDA and 0 wt % PVDF.

Cathode C3 comprised 10 wt % carbon black, 75 wt % LFP, 5 wt % LiTFSI, 2.5 wt % $Al_{0.15}Li_{6.85}La_3Zr_{1.75}Ta_{0.25}O_{12}$ with diameters that ranged from 10 to 2000 nm, 5.62 wt % EC, 1.88 wt % polymer matrix that is derived from PEGDA and 0 wt % PVDF.

Figure 4A:
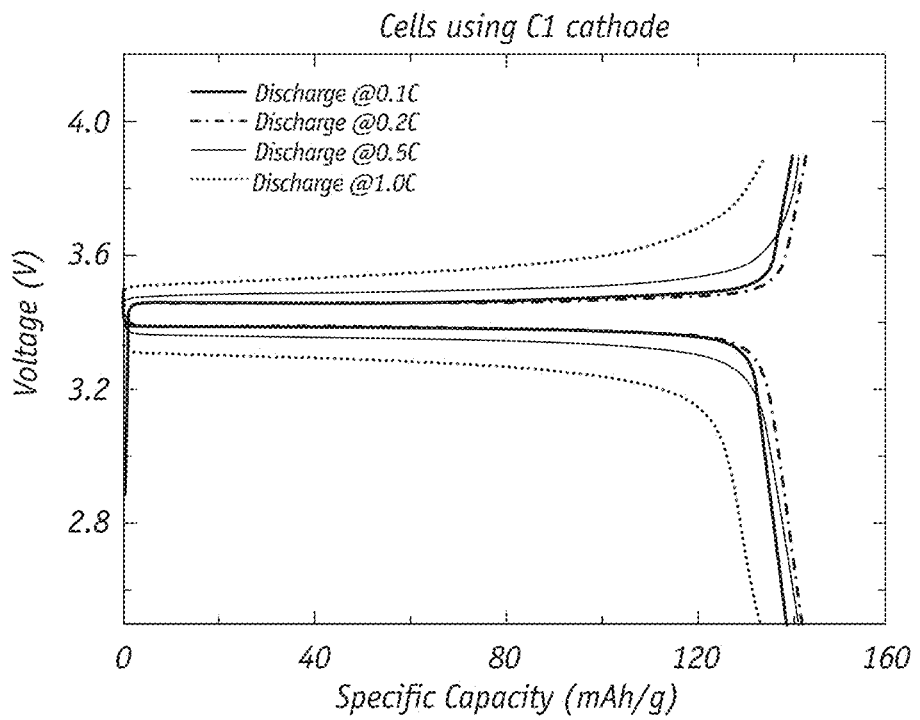
FIGS. 4A-4C are charge-discharge profiles of coin cells comparing the performance of cells with different cathode formulations.
Figure 4B:
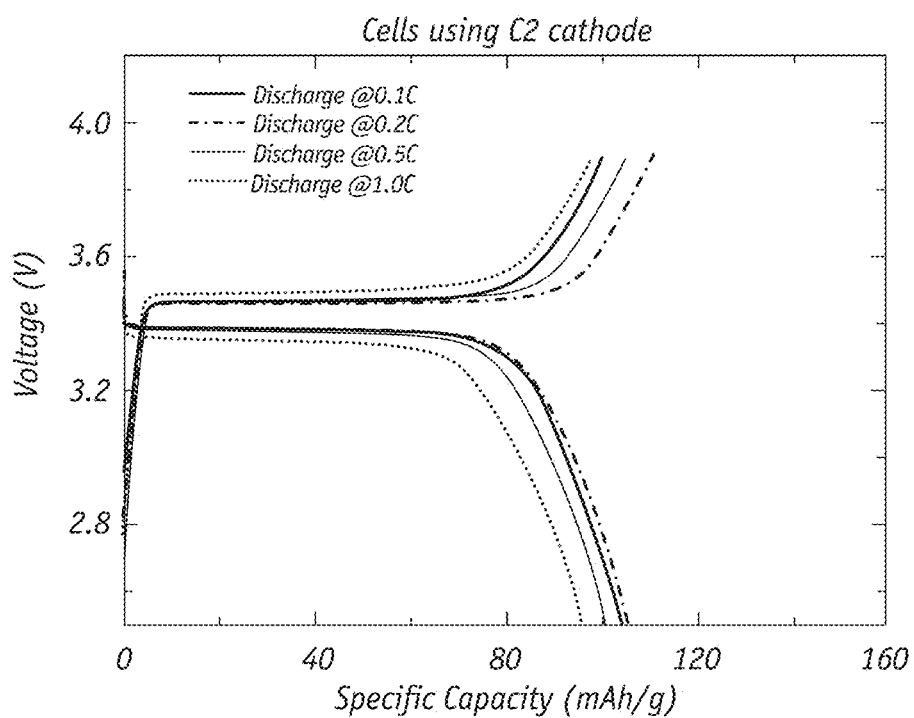
Figure 4C:
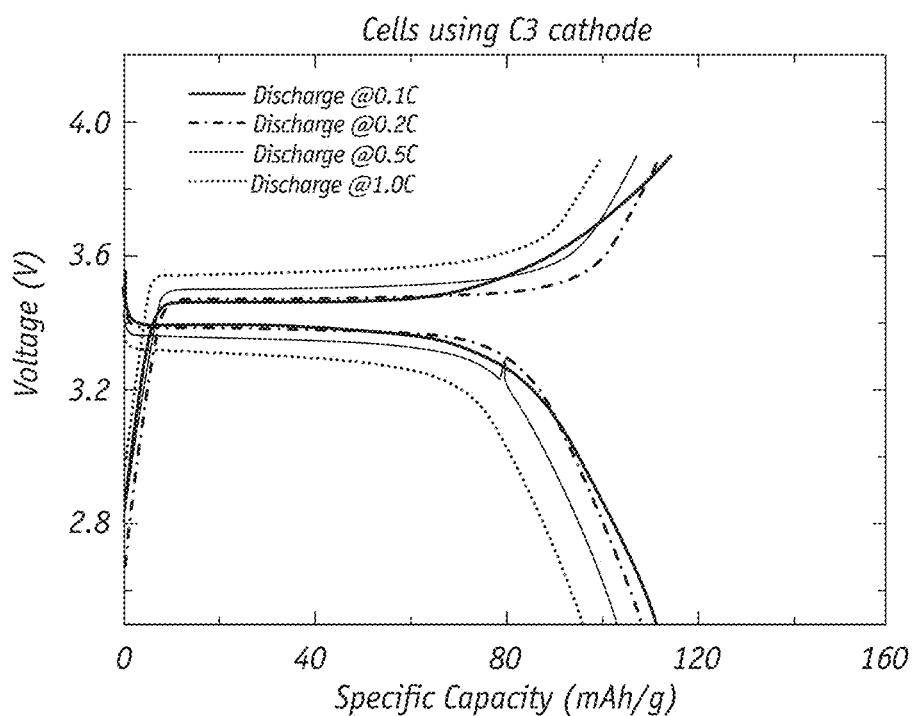
Figure 5A:
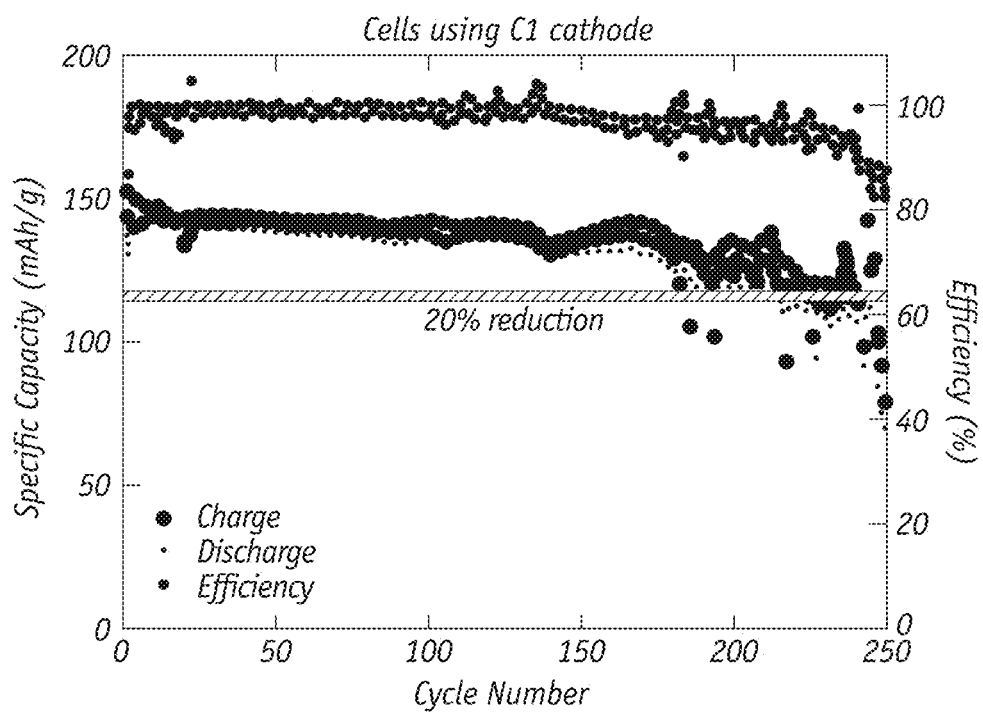
FIGS. 5A-5C are cycling stability profiles of coin cells comparing the performance of cells with different cathode formulations.
Figure 5B:
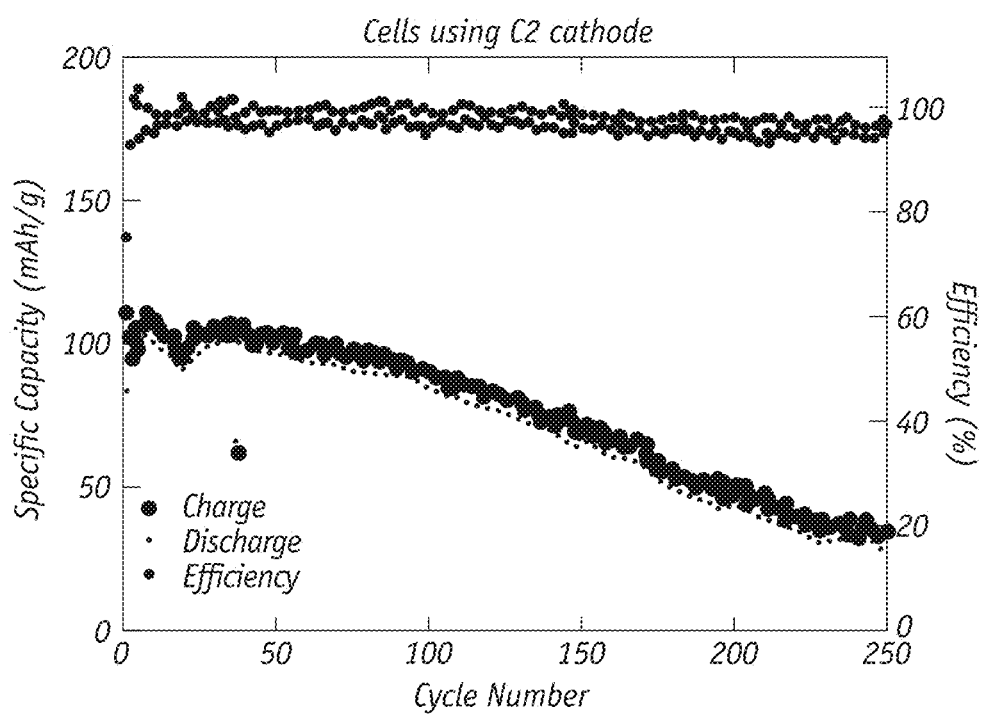
Figure 5C:
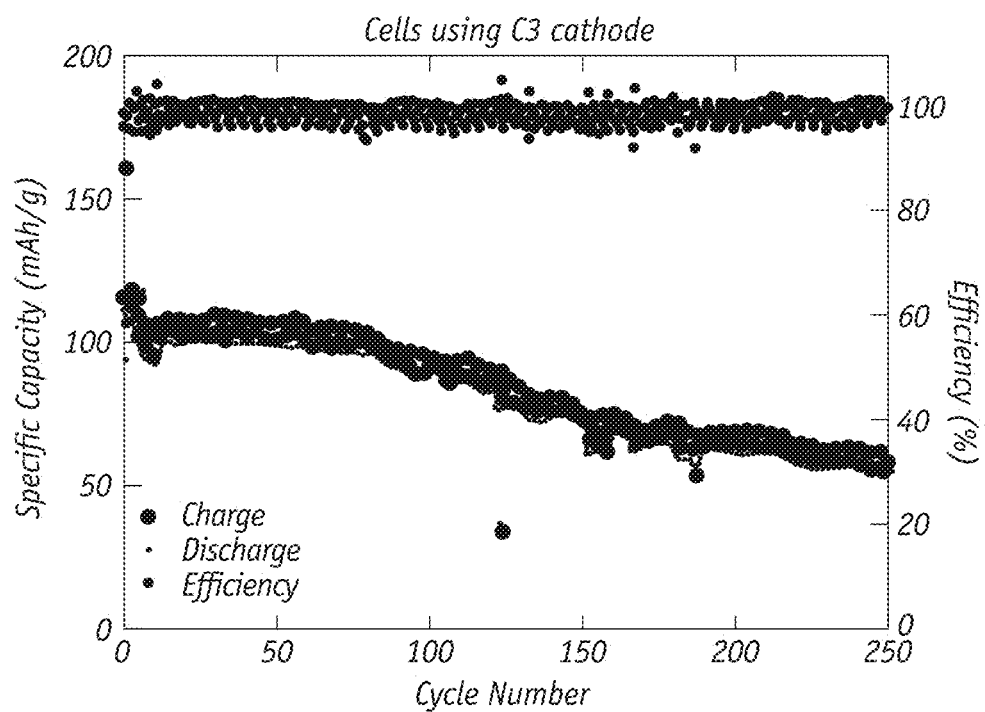

FIGS. 4A, 4B and 4C are the rate performance and FIGS. 5A, 5B and 5C are the cycling stability data for electrochemical data cells using cathode C1, C2 and C3, respectively. Cathode C1 presents high specific capacity of 140 mAh/g when the test current rates are 0.1 C, 0.2 C and 0.5 C, and only negligible reduction in capacity when current is 1.0 C. For cycle stability, cathode C1 exhibits nearly no capacity reduction before 100 cycles and close to 80% capacity retention near 250 cycles. The coin cell is not stable after 250 cycles.

For medium and high electrolyte weight ratio cathodes C2 and C3, the coin cells exhibit lower specific capacities in the rate performance tests. For the testing current rate of 0.1 C, 0.2 C, 0.5 C, 1.0 C, the specific capacities of the coin cells using cathode C2 is 105 mAh/g, 106 mAh/g, 101 mAh/g, 97 mAh/g, respectively, and the specific capacity of coin cell using cathode C3 is 118 mAh/g, 117 mAh/g, 106 mAh/g and 96 mAh/g, respectively. The slightly lower specific capacity is caused by the heavier electrolyte component compared to other components within the electrode. On average, the total weight of cathode sheets with high electrolyte weight ratio is 30% more than that of the non-electrolyte containing cathode sheets. The specific capacity drops as the test current rate is enhanced for both coin cells and the trend is consistent to previous coin cells results. The cathode C2-based coin cell exhibits more rapid decrease in specific capacity during the cycling stability test, which retains below 50% specific capacity after 200 cycles. However, the cathode C3-based coin cell exhibits extended cycling stability in return, although it also shows lower specific capacity during the rate performance test. It is shown that the coin cell still has 80% of original capacity at 250 cycles and 60% of original capacity at 400 cycles. The coin cell can be charged/discharged at 0.5 C after 500 cycles without failure and retains 53% of original coin cell capacity. In view of the fact that each coin cell is charged/discharged at 0.5 C for the cycling stability test which is greatly higher than that normally used in cycling stability studies, it is expected that an electrolyte-filled composite cathode will enhance overall stability for ASSLiBs, although the electrode is heavier and the specific capacity is lower. The cathode with high weight ratio of electrolyte has better performance in rate performance and cycling stability.

Further investigation regarding graphite infiltrated by SSE was conducted where the structure of coin cell was an electrolyte-infiltrated composites graphite anode/SSE/lithium.

Coin cells containing different anode formulations designated A1, A2 and A3 which have different levels of polymer matrix were evaluated. Three different anode formulations were evaluated where A1, A2 and A3 are low, medium and high electrolyte weight ratio respectively. For each coin cell, lithium metal sheet is used as the reference electrode for electrode characterization.

The solid-state electrolyte membrane positioned between the anode and cathode comprised 12.5 wt % polymer matrix that is derived from PEGDA, 37.5 wt % EC, 33 wt % LiTFSI, 17 wt % $Al_{0.15}Li_{6.85}La_3Zr_{0.75}Ta_{0.25}O_{12}$ with diameters that ranged from 10 to 2000 nm.

Anode A1 comprised 10 wt % carbon black, 75 wt % graphite, 1.67 wt % LiTFSI, 0.83 wt %, $Li_7La_3Zr_{1.75}Nb_{0.25}O_{12}$ with diameters that ranged from 10 to 2000 nm, 1.88 wt % EC, 0.62 wt % polymer matrix that is derived from PEGDA and 10 wt % PVDF.

Anode A2 comprised 10 wt % carbon black, 75 wt % graphite, 3.34 wt % LiTFSI, 1.66 wt % $Li_7La_3Zr_{1.75}Nb_{0.25}O_{12}$ with diameters that ranged from 10 to 2000 nm, 3.75 wt % EC, 1.25 wt % polymer matrix that is derived from PEGDA and 5 wt % PVDF Anode A3 comprised 5 wt % carbon black, 80 wt % graphite, 5 wt % LiTFSI, 2.5 wt % $Li_7La_3Zr_{1.75}Nb_{0.25}O_{12}$ with diameters that ranged from 10 to 2000 nm, 5.62 wt % EC, 1.88 wt % polymer matrix that is derived from PEGDA and 0 wt % PVDF.

Figure 6A:
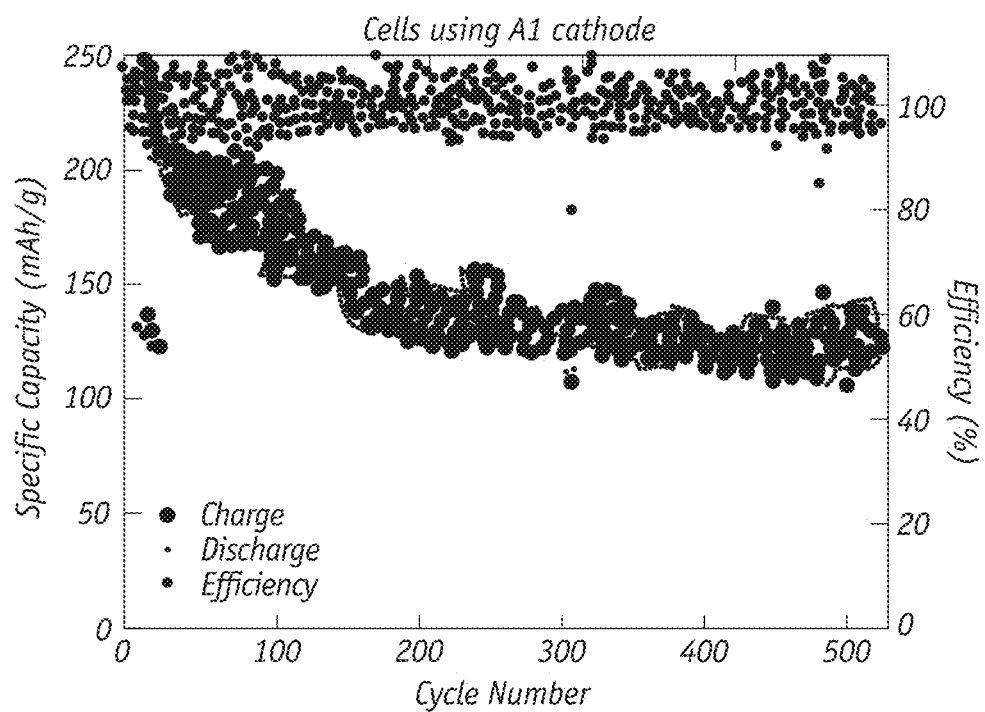
FIGS. 6A-6C are cycling stability profiles of coin cells comparing the performance of cells with different anode formulations.
Figure 6B:
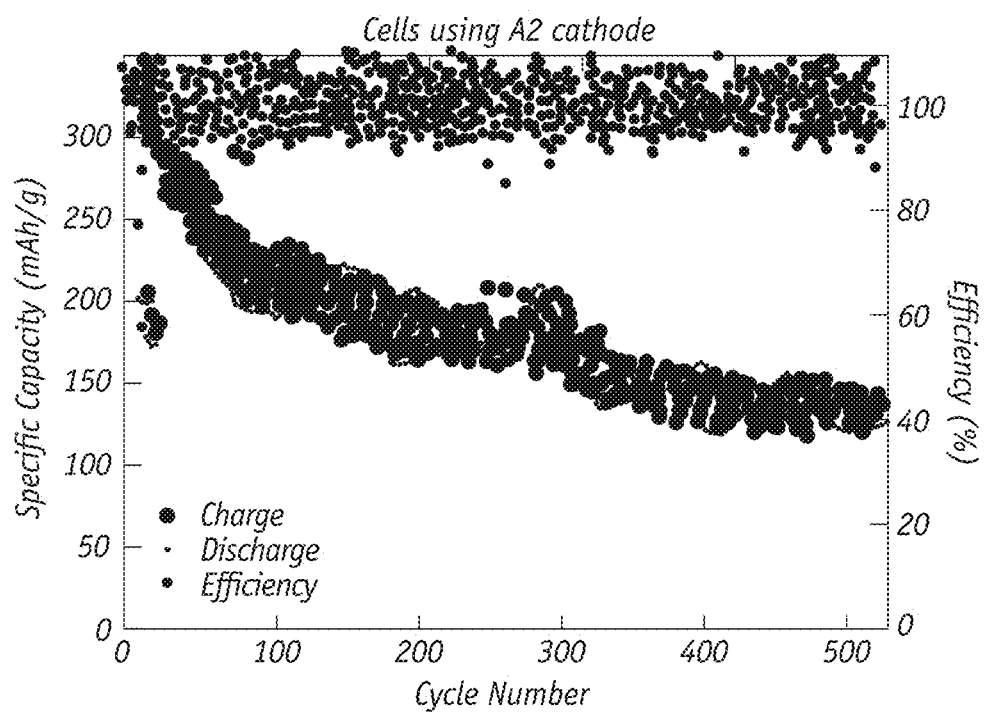
Figure 6C:
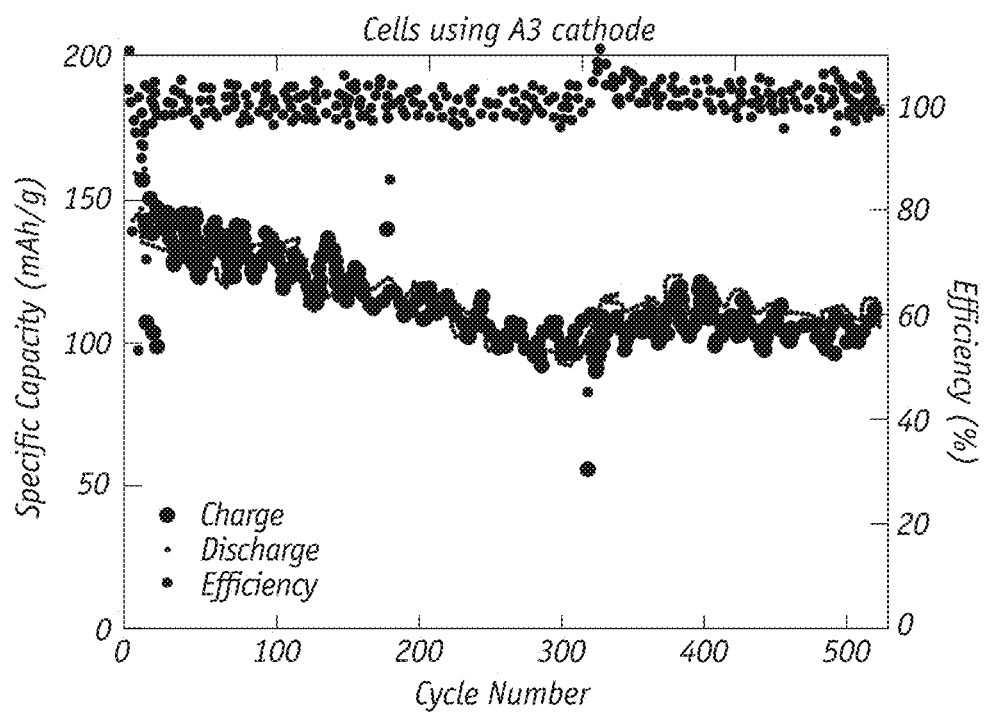

FIGS. 6A, 6B, and 6C are data of cycling stability experiments of corresponding half-cells based on the three different anode compositions. All these half-cells were charged/discharged at 0.1 C-1.0 C for rate performance tests and 0.5 C for cycling stability tests. The experimental specific capacity of graphite is around 340 mAh/g. In the first 6 cycles where the charge/discharge rate is 0.1 C (rate performance test), coin cell using anode A3 anode has lowest specific charge/discharge capacity of around 150 mAh/g among all three types of coin cells. Coin cell using A1 and A2 anodes exhibit over 300 mAh/g in specific charge/discharge capacity which is close to the theoretical value of graphite. The specific capacity drops gradually for all three of the coin cells as the cycling number increases. In the cycling stability test, coin cell using anode A2 has higher specific capacity than coin cells using anode A3. After 500 cycles, both coin cells exhibit a specific capacity around 130 mAh/g, which retains around 43% of the original value. The anode with medium weight ratio of electrolyte has better performance in rate performance and cycling stability.

Figure 7A:
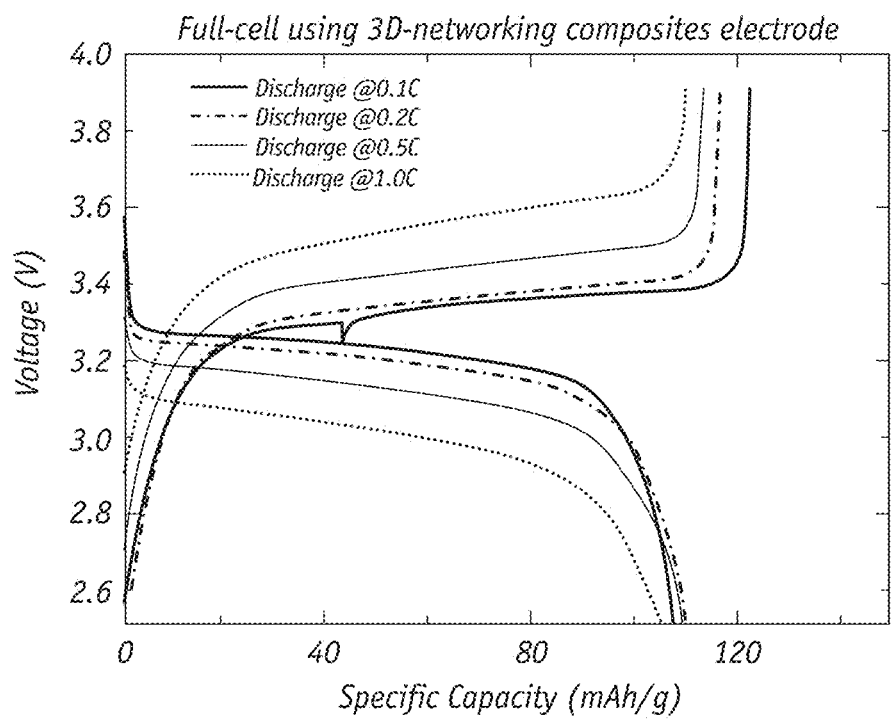
FIGS. 7A and 7B are the charge-discharge profiles and cycling stability profiles, respectively, for coin cells.
Figure 7B:
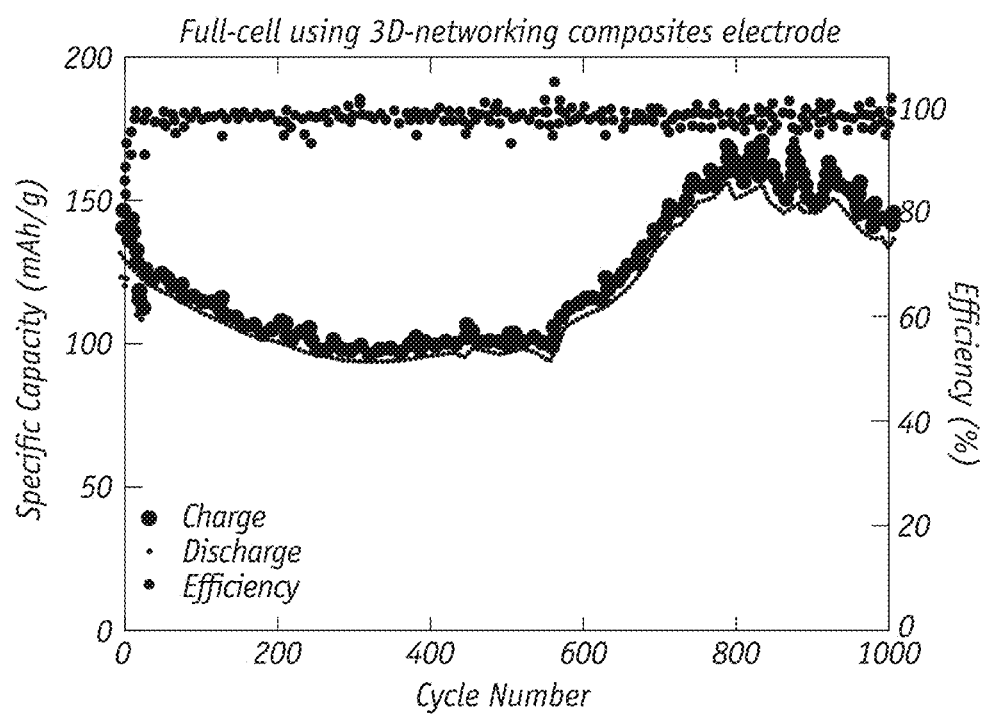

FIG. 7A and FIG. 7B are rate performance and cycling stability data for the full-cells which comprised electrolyte-infiltrated composite electrodes. Cells were charged/discharged at 0.1 C-1.0 C for rate performance test and 0.5 C for cycling stability test. When the coin cell is charged and discharged at 0.1 C, 0.2 C, 0.5 C and LOC, the specific capacity is around 123 mAh, 115 mAh/g, 110 mAh/g and 105 mAh/g, respectively. In the first 600 cycles, the specific capacity drops from 150 mAh/g gradually to around 100 mAh/g, which is nearly ⅓ attenuation. After 600 cycles, however, the specific capacity increases reversely to above 160 mAh/g and reaches the highest point in 835 cycles. After 835 cycles, the specific capacity then decreases and in around 1100 cycles, the specific capacity is nearly 140 mAh/g. In summary, the specific capacity after 1100 cycles shows a little enhancement as compared to the cell's original value. The charge/discharge process is taken continuously over 6 months which indicates that the cell possesses both long lifetime and cycling stability. Possible reasons for the specific capacity increase between 600 cycles and 835 cycles are (1) element doping that leads to an increase in the number of defect sites and vacancies as $Li^+$ active sites on the surface of the graphite (the possible elements may be N and F from LiTFSI) and (2) disordered carbon structure in the graphite may create many unoccupied sites and lithium atoms may fill these sites through the production process of SSE and greatly enhance the specific capacity.

All solid-state pouch cells with multiple unit cells in parallel were prototyped using the 3D-networking composite electrode. The basic configuration of the prototypes is presented in FIGS. 3C. Double-side printed LFP sheets and graphite sheets as well as SSE layer are stacked. A complete all solid-state standard pouch cell with dimensions of 6.3 cm×4.7 cm×9.34 mm exhibits total capacity over 2 Ah and retains over 70% after 200 cycles. With the balance between capacity and energy density, the optimized mass energy density and volume energy density of the all solid-state pouch cell prototype could reach over 100 Wh/kg and 250 Wh/L.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. An electrochemical cell which comprises:
   (a) an electrolyte-infiltrated composite anode that comprises: (i) a first polymer matrix, (ii) first ceramic nanoparticles that are distributed in the first polymer matrix, (iii) a lithium salt, (iv) a plasticizer, (v) an anode active material that is distributed in the first polymer matrix, (vi) a first conducting agent that is distributed in the first polymer matrix, and (vii) a binder if the weight ratio of the anode active material is greater than 80 wt %; and
   (b) electrolyte-infiltrated composite cathode that comprises: (i) a second polymer matrix, (ii) second ceramic nanoparticles that are distributed in the second polymer matrix, (iii) a lithium salt, (iv) a plasticizer, (v) a cathode active material that is distributed in the second polymer matrix, (vi) a second conducting agent that is distributed in the second polymer matrix and (vii) a binder if the weight ratio of the cathode active material is greater than 80 wt %; and
   (c); interposed between the anode and the cathode, a solid-state electrolyte which comprises a ceramic-polymer composite electrolyte membrane that comprises: (i) a third polymer matrix, (ii) third ceramic nanoparticles with diameters that range from 10 to 2000 nm and that are distributed in the third polymer matrix, (iii) plasticizer and (iv) lithium salt, wherein the third ceramic nanoparticles are selected from the group consisting of ceramic materials having the basic formula $Li_7La_3Zr_2O_{12}$ (LLZO) and derivatives thereof wherein at least one of Al, Ta or Nb is substituted in Zr sites of the $Li_7La_3Zr_2O_{12}$ and wherein the membrane has an ionic conductivity of higher than $1\times10^{-4}$ S/cm when measured at a temperature in the range of $-20°$ C. to $10°$ C. and higher than $1\times10^{-3}$ S/cm when measured at a temperature $20°$ C. or higher.

2. The electrochemical cell of claim 1 wherein the third ceramic nanoparticles are $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof.

3. The electrochemical cell of claim 1 wherein the third ceramic nanoparticles comprise $Li_7La_3Zr_{2-z}Nb_zO_{12}$ wherein z ranges from 0.01 to 0.60.

4. The electrochemical cell of claim 1 wherein the first and second ceramic nanoparticles are nanoparticles are selected from the group consisting of ceramic materials having the basic formula $Li_7La_3Zr_2O_{12}$ (LLZO) and derivatives thereof wherein at least one of Al, Ta or Nb is substituted in Zr sites of the $Li_7La_3Zr_2O_{12}$.

5. The electrochemical cell of claim 4 wherein the first and second ceramic nanoparticles are $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof.

6. The electrochemical cell of claim 5 wherein the first and second ceramic nanoparticles comprise $Li_7La_3Zr_{2-z}Nb_zO_{12}$ wherein z ranges from 0.01 to 0.60.

7. The electrochemical cell of claim 1 wherein the anode active material comprises lithium or graphite.

8. The electrochemical cell of claim 1 wherein the cathode active material lithium iron phosphate.

9. The electrochemical cell of claim 1 wherein the first polymer matrix, second polymer matrix and third polymer matrix are derived from the same polymer precursors.

10. A process for preparing an electrochemical cell which comprises:
    (a) providing a ceramic-polymer-infiltrated composite anode that comprises: (i) a first polymer matrix, (ii) first ceramic nanoparticles that are distributed in the first polymer matrix, (iii) a lithium salt, (iv) a plasticizer, (v) an anode active material that is distributed in the first polymer matrix, (vi) a first conducting agent that is distributed in the first polymer matrix, and (vii) a binder if the weight ratio of the anode active material is greater than 80 wt %;
    (b) providing a ceramic-polymer-infiltrated composite cathode that comprises: (i) a second polymer matrix, (ii) second ceramic nanoparticles that are distributed in the second polymer matrix, (iii) a lithium salt, (iv) a plasticizer, (v) a cathode active material that is distributed in the second polymer matrix, (vi) a second conducting agent that is distributed in the second polymer matrix, and (vii) a binder if weight ratio of cathode active material is high greater than 80 wt %; and
    (c) forming a sold-state electrolyte between the cathode and anode which comprises ceramic-polymer composite electrolyte membrane that comprises: (i) a third polymer matrix, (ii) third ceramic nanoparticles with diameters that range from 10 to 2000 nm and that are distributed in the third polymer matrix, (iii) plasticizer and (iv) lithium salt, wherein the third ceramic nanoparticles are selected from the group consisting of ceramic materials having the formula $Li_7La_3Zr_2O_{12}$ (LLZO) and derivatives thereof wherein at least one of Al, Ta or Nb is substituted in Zr sites of the $Li_7La_3Zr_2O_{12}$ wherein the membrane has an ionic conductivity of higher than $1\times10^{-4}$ S/cm when measured at a temperature in the range of $-20°$ C. to $10°$ C. and higher than $1\times10^{-3}$ S/cm when measured at a temperature $20°$ C. or higher.

11. The process of claim 10 wherein at least one of the first, second, or third ceramic nanoparticles are $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof.

12. The process of claim 10 wherein the solid-state electrolyte is a film has a thickness (d) and is formed in a pre-designed module with a well-defined geometry.

13. A process for preparing an electrochemical cell which comprises:
    (a) providing a ceramic-polymer-infiltrated composite anode that comprises: (i) a first polymer matrix, (ii) first ceramic nanoparticles that are distributed in the first polymer matrix, (iii) a lithium salt, (iv) a plasticizer, (v) an anode active material that is distributed in the first polymer matrix, (vi) a first conducting agent that is distributed in the first polymer matrix, and (vii) a binder if the weight ratio of the anode active material is greater than 80 wt %;
    (b) providing a ceramic-polymer-infiltrated composite cathode that comprises: (i) a second polymer matrix, (ii) second ceramic nanoparticles that are distributed in the second polymer matrix, (iii) a lithium salt, (iv) a plasticizer, (v) a cathode active material that is distributed in the second polymer matrix, (vi) a second conducting agent that is distributed in the second polymer matrix, and (vii) a binder if weight ratio of cathode active material is high greater than 80 wt %; and (c) forming a sold-state electrolyte between the cathode and anode which comprises ceramic-polymer composite electrolyte membrane that comprises: (i) a third polymer matrix, (ii) third ceramic nanoparticles with diameters that range from 10 to 2000 nm and that are distributed in the third polymer matrix, (iii) plasticizer and (iv) lithium salt, wherein the third ceramic nanoparticles are selected from the group consisting of ceramic materials having the formula $Li_7La_3Zr_2O_{12}$ (LLZO) and derivatives thereof wherein at least one of Al, Ta or Nb is substituted in Zr sites of the $Li_7La_3Zr_2O_{12}$, wherein the solid-state electrolyte is a film which has a thickness (d) and is formed in a pre-designed module with a well-defined geometry and is formed on the cathode and wherein the concentration of ceramic nanoparticles decreases in the direction of the cathode to form a concentration gradient over the thickness of the film.

14. The process of claim 13 wherein at least one of the first, second, or third ceramic nanoparticles are $Al_xLi_{7-x}La_3Zr_{2-y-z}Ta_yNb_zO_{12}$ where x ranges from 0 to 0.85, y ranges from 0 to 0.50 and z ranges from 0 to 0.75, wherein at least one of x, y and z is not equal to 0, and mixtures thereof.

* * * * *